Figure 1:
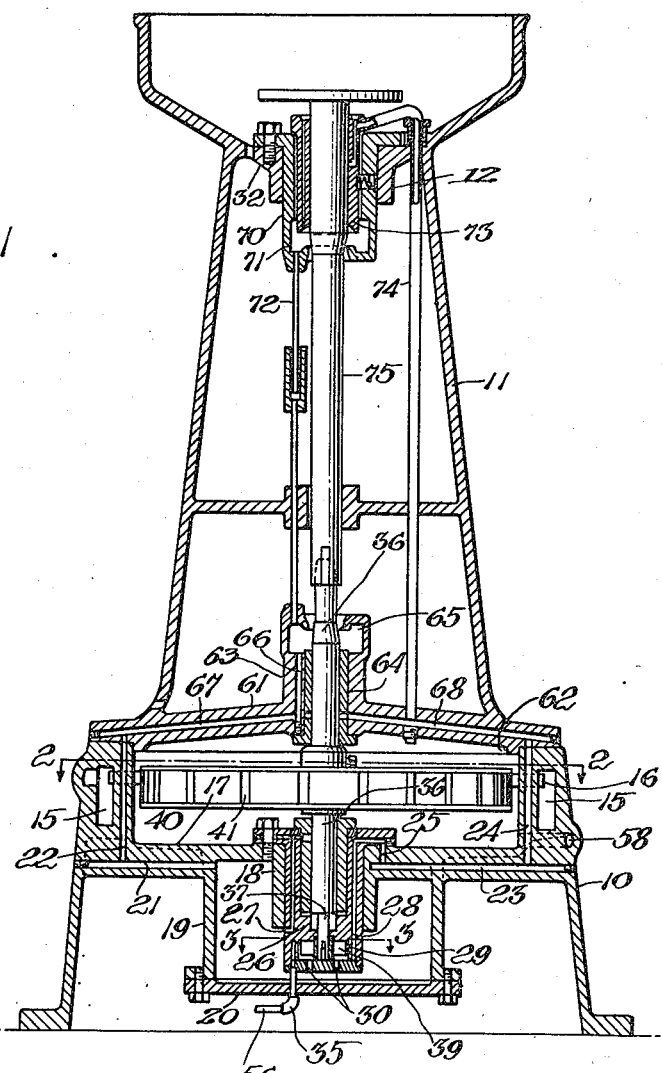

E. C. WOOD.
FORCE FEED LUBRICATOR AND GOVERNOR FOR ROTATABLE SPINDLES.
APPLICATION FILED AUG. 29, 1913.

1,134,714.

Patented Apr. 6, 1915.

2 SHEETS—SHEET 1.

Witnesses:
A. H. McGlinchey.
E. C. Murphy.

Inventor:
Edward C. Wood
By Henry J. Miller
atty.

E. C. WOOD.
FORCE FEED LUBRICATOR AND GOVERNOR FOR ROTATABLE SPINDLES.
APPLICATION FILED AUG. 29, 1913.
1,134,714.
Patented Apr. 6, 1915.
2 SHEETS—SHEET 2.
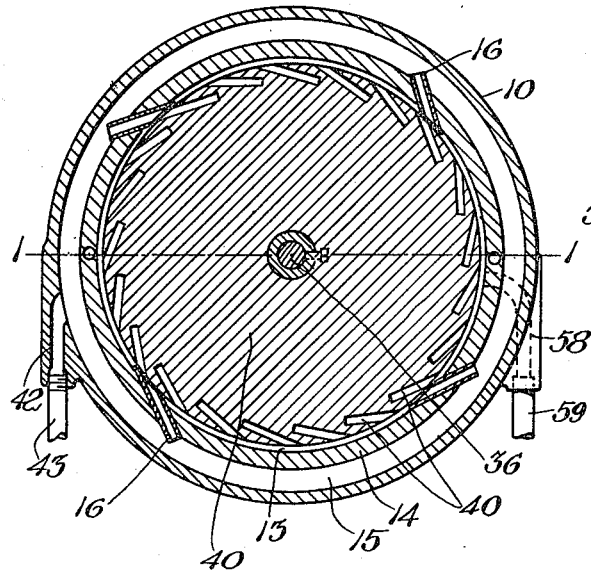
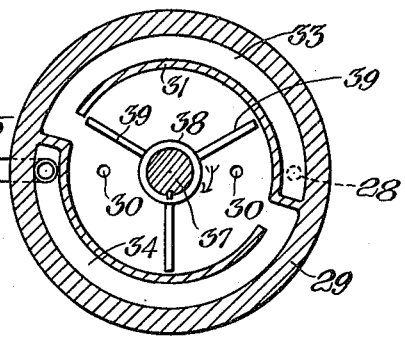
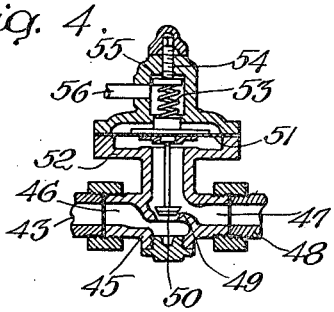
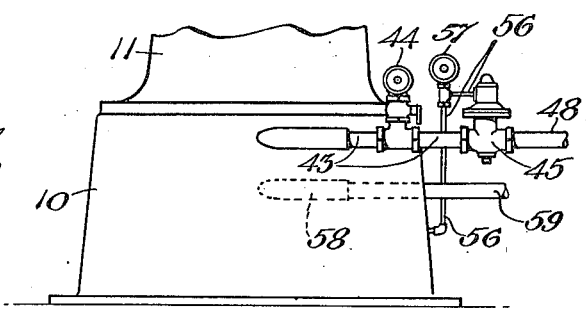
Witnesses:
A. H. McGlinchey.
E. C. Murphy.
Inventor:
Edward C. Wood.
By Henry J. Miller
Atty.

UNITED STATES PATENT OFFICE.

EDWARD C. WOOD, OF SOMERVILLE, MASSACHUSETTS, ASSIGNOR TO JOHN W. DAVIES, OF READING, MASSACHUSETTS.

FORCE-FEED LUBRICATOR AND GOVERNOR FOR ROTATABLE SPINDLES.

1,134,714. Specification of Letters Patent. Patented Apr. 6, 1915.

Application filed August 29, 1913. Serial No. 787,297.

*To all whom it may concern:*

Be it known that I, EDWARD C. WOOD, a citizen of the United States, residing at Somerville, in the county of Middlesex and State of Massachusetts, have invented certain new and useful Improvements in Force-Feed Lubricators and Governors for Rotatable Spindles, of which the following is a specification, reference being had to the accompanying drawings, forming part thereof.

This invention has reference to improvements in apparatus to supply oil or other fluid lubricant to the bearings of motor driven spindles and to control or govern the supply of pressure fluid by which the motor is operated.

One object of the invention is to so construct a force feed lubricator of this nature that the forcing of the lubricant to certain of the bearings is effected by mechanism carried by the spindle to be lubricated and in a novel manner and at the same time to control the speed of the spindle.

Another object of the invention is to provide a novel governor for fluid pressure operated motors.

Other objects of the invention will appear from the following description.

The invention consists in such novel features of construction and combination of parts as shall hereinafter be more fully described and pointed out in the claims.

Figure 1, represents a vertical sectional view of the improved apparatus taken as on line 1—1 Fig. 2 parts of the same being shown in full lines. Fig. 2, represents a cross sectional view of parts of the same as taken on line 2—2 Fig. 1. Fig. 3, represents an enlarged detail sectional view of portions of the force feed for the lubricating and governing fluid as taken on line 1—1 Fig. 2. Fig. 4, represents an enlarged vertical sectional view of the steam inlet valve and its controller or governor. Fig. 5, represents a view in elevation of a part of the machine base to show the relative positions of the steam supply and escape pipes and the oil pipe connected with the controller chamber of the steam supply valve.

Similar characters of reference designate corresponding parts throughout.

As shown in the drawings my improved force feed lubricator and governor is shown as applied to the rotatable spindle of an emulsifying machine and my apparatus has a frame in the nature of a casting having the base 10 the shaft or column 11 having the internal bolster supporting member 12, but the construction of the casing may be varied considerably from that shown.

Base 10 has the turbine chamber 13 embraced by the wall 14 having the annular steam passage 15 provided with the nozzles 16, 16 which deliver to the upper portion of said chamber 13, and said chamber has the bottom wall 17 from which depends the collar 18 and the oil reservoir wall 19 which is closed at its lower end by the plate 20 secured in place by bolts or in any other suitable manner. Formed in the wall 17 are the oil ducts 21, 22 and 23, 24, 25 of which the duct 21 opens into the space within wall 19 while ducts 22 and 24 are open at the upper surface of wall 14 and duct 25 is open to the surface of wall 17. Mounted in the collar 18 is the step bearing member 26 having in its wall the oil ducts 27, opening into the bore of said bearing and into said oil reservoir, and 28 which communicates with the duct 25 of wall 17 at one end, and at the other end, communicates with the compartment 29 formed at the lower end of said step bearing member 26 and having the openings 30, 30 at its lower end whereby oil may pass into said compartment from the oil reservoir formed within wall 18. This compartment 29 is shown in enlarged cross sectional shape in Fig. 3 and has the partitions 31 and 32 forming segmental channels 33 and 34 each closed at one end and having at such closed ends respectively the duct 28, above referred to, and the controller oil supply pipe 35, the purpose of which will hereinafter be explained.

Journaled in the bore of the step bearing member 26 and sustained thereby is the driven spindle 36 having at its lower end an extension 37 of reduced diameter which extends into compartment 29 and is furnished with the collar 38 having the radially extending blades 39, 39 which, under rotation in the direction indicated by the arrow in Fig. 3, drives oil contained in said compartments 33 and 34 and ultimately forces said oil into duct 28 and pipe 35. Mounted on said spindle 36 within chamber 13 is the turbine 40 having in its periphery a series of tangential pockets or buckets 41, 41, Fig.

2, which are adapted to receive steam, at their upper portions, from the steam nozzles 16, 16 as shown in Figs. 1 and 2.

Steam is supplied to the passage 15 through the duct 42 from pipe 43 which latter is provided with the gage 44 and the valve chamber 45 (see Fig. 4) having the outlet 46 communicating with said pipe 43 and the inlet 47 communicating with any steam supply pipe 48. Inlet 47 is separated from the outlet 46 by the partition 49 having a valve seat adapted to be closed by the valve 50 the stem of which is secured so as to be operated by the flexible diaphragm 51 in the chamber 52 of said valve casing and a tension spring 53 is provided which bears on said diaphragm 51 and is furnished with the tension screw 54 adjustably mounted in the wall of the casing 55 above said diaphragm. An oil pipe 56 having the gage 57 communicates with this casing 55 and said oil pipe extends into base 10 and connects with the oil pipe 35 of compartment 29. Waste steam and water of condensation escapes from the turbine chamber 13 through the channel 58 of base 10 to pipe 59.

Column 11 forms a support for the bolster supporting member 12 and has the lower member 61 closing the upper portion of the turbine chamber 13 and having the lip 62 fitting inside the wall of said chamber 13. This lower member 61 has the central collar 63 which receives the bearing sleeve 64, for this portion of the spindle 36, and in the upper portion of this collar is the oil receptacle 65, to receive the oil which runs down the spindle, which receptacle is connected by the ducts 66 and 67, formed respectively in the wall of collar 63 and the member 61, with the duct 22 of base 10. Extending from the duct 24 of base 10 to the bearing sleeve 64 is the oil supply duct 68.

Bolster member 12 is provided with the bolster sleeve 70 having at its lower end the oil receptacle 71 which is drained, through pipe 72 to the receptacle 65 of collar 63. Within the member 12 is suitably mounted the spindle bearing 73 which is supplied with oil by the pipe 74 leading from the duct 68 of column member 61.

Journaled in the bearing 73 is the spindle 75 carrying or driving any mechanism which is adapted to be operated by the rotation of said spindle 75 which, at its lower end, is slidably engaged with spindle 36 whereby these members 36 and 75 form a two part spindle.

When steam is supplied through pipe 48 to valve chamber 45 valve 50 is normally in the open position to permit the steam to pass through the open valve seat in partition 49 of said chamber 45 and thence through pipe 43 to the steam passage 15 in base 10 from whence said stream is directed by the nozzles 16, 16 against and into the upper portions of the pockets 41 in the turbine rotor 40 whereby said rotor and its spindle 36 with the spindle 74, connected with spindle 36, are caused to rotate rapidly, the spent steam passing downward through said pockets 41 into the lower portion of the turbine chamber 17 and escaping through the channel 58 to pipe 59.

Oil reservoir 17 is usually filled with oil to or above the line 3—3 Fig. 1, and hence enters fan chamber 29 through the passages 30, 30 where it is driven centrifugally by the fan blades 39, 39, operated by the rotation of spindle 36 and its extension 37, and enters the channels 33 and 34 of said fan chamber. This centrifugal pressure on the oil is sufficient to force a quantity thereof through pipes 35 and 56 into the diaphragm compartment 55 and against the upper portion of diaphragm 51 but such pressure is, under normal conditions, resisted by said diaphragm. If, under undue pressure of steam or under other abnormal conditions, the turbine rotor 40 and its spindle 36 are rotated at an excessive speed the increased speed of rotation of the fan blades 39, 39 will exert such pressure on the oil in the fan chamber 29 and pipes 35, 56 that diaphragm 51 will be forced downward whereby the diaphragm valve 50 will approach its seat in partition 49 and partially or wholly shut off the supply of steam. The oil forced by the rotation of the fan blades 39, 39 into the channel 33 will rise through the duct 28, in the wall of chamber 29 and will pass through the ducts 25, 23, 24 and 68, supplying the bearings of spindle 36, and from duct 68 said oil will pass upward through pipe 74 to the upper bearing of spindle section 75 and will then drain downward into the oil receptacle 71 and thence through pipe 72 to the receptacle 65 from which said oil will pass, through the ducts 67, 22 and 21 back to the oil reservoir 19.

Having thus described my invention I claim as new and desire to secure by Letters Patent—

1. Apparatus of the nature described comprising a motor chamber having an oil reservoir, a fan chamber communicating with said reservoir, the walls of said chambers having ducts communicating with said fan chamber and with the bearings to be lubricated, a spindle rotatable in said bearings, a fluid driven motor on said spindle within said motor chamber, a fan on said spindle within said fan chamber, and means for directing fluid toward said motor.

2. Apparatus of the nature described comprising a base having a motor chamber, an oil reservoir and a fan chamber depending from said motor chamber into said reservoir and in communication therewith, bearings above and below said motor chamber, said latter chamber having in its walls ducts communicating with said fan chamber and with said bearings, a spindle journaled in said bearings and having a motor and a fan positioned in their respective casings, and means for supplying steam to said motor.

3. Apparatus of the nature described comprising a base having a motor chamber, a bearing above said chamber, an oil reservoir below said chamber, a step bearing depending into said oil reservoir and having a fan chamber in communication with said reservoir, said step bearing and said base having in their walls ducts communicating with said fan chamber and with said upper bearing, the wall of said base having a drain duct communicating with said upper bearing and with said reservoir, a spindle journaled in said bearings and having a motor and a fan positioned in their respective chambers, and means for supplying steam to said motor.

4. Apparatus of the nature described comprising a base having a motor chamber, an oil reservoir depending therefrom and a bearing located above said reservoir, the wall of said chamber having a steam channel, communicating by nozzles with said chamber, and oil ducts leading to and from said bearing, a bearing mounted in said chamber extending into said reservoir and having a fan chamber having openings through one wall and a duct communicating with one of the ducts of said motor chamber wall, a spindle journaled in said bearings, a motor on said spindle within said motor chamber, and a fan on said spindle within said fan chamber.

5. Apparatus of the nature described comprising a motor chamber having steam inlets and an outlet, a spindle journaled in bearings of said chamber and having a steam actuated motor and a fan, a fan chamber embracing said fan and adapted to contain oil, a lubricating duct leading from said fan chamber, a pressure oil duct also leading from said fan chamber, a steam supply pipe connected with said steam inlet, and a controlling valve for said steam pipe having pressure operated valve closing means in communication with said pressure oil duct.

6. Apparatus of the nature described comprising a turbine motor casing having a bearing furnished with a fan chamber having inlet ports, an oil reservoir adapted to deliver oil to said ports, a steam supply delivering to said chamber and including a steam pipe having a pressure controlled valve, a pressure pipe leading from said fan chamber to the casing of said valve, and a shaft journaled in said bearing and having a turbine rotor within said turbine chamber and a fan within said fan chamber.

7. Apparatus of the nature described comprising a turbine casing having a depending oil reservoir, upper and lower bearings for said casing of which the lower bearing has a fan chamber communicating with said reservoir and having a pair of segmental channels each open at one end and having outlets, ducts leading from one of said outlets to one of said bearings, a pressure pipe leading from the other of said outlets, a shaft journaled in said bearings and having a fan within said fan chamber and a turbine rotor within said turbine casing, means for supplying steam to such casing including a valve casing having a diaphragm chamber, a diaphragm in said diaphragm chamber, and a valve adapted to be operated by the movement of said diaphragm, said pressure pipe communicating with said diaphragm chamber.

8. Apparatus of the nature described comprising a base having a column thereon and furnished with a turbine chamber and an oil reservoir depending from said chamber, bearing members located respectively at the upper portions of said column and chamber, a third bearing member extending from the lower portion of said chamber into said reservoir and having a fan chamber communicating with said reservoir, said latter bearing member and the wall of said base having supply ducts communicating with the bearings of said turbine chamber, a return duct leading from the upper bearing of said chamber to said reservoir, pipes respectively between said supply duct and the upper bearing of said column, and between said latter bearing and the upper bearing of said chamber, a turbine rotor spindle journaled in said bearings, and a fan on said spindle within said fan chamber.

EDWARD C. WOOD.

Witnesses:
HENRY J. MILLER,
ESTHER C. MURPHY.